US007266901B2

(12) United States Patent
Taniguchi et al.

(10) Patent No.: US 7,266,901 B2
(45) Date of Patent: Sep. 11, 2007

(54) MULTIPLE-BOLT INSERTION TOOL

(75) Inventors: Takao Taniguchi, Anjo (JP); Shigeharu Ikeda, Anjo (JP); Tadayoshi Funahara, Anjo (JP); Hideaki Sugiura, Anjo (JP); Hiroshi Osada, Anjo (JP)

(73) Assignee: Aisin AW Co., Ltd. (JP)

( * ) Notice: Subject to any disclaimer, the term of this patent is extended or adjusted under 35 U.S.C. 154(b) by 0 days.

(21) Appl. No.: 11/448,890

(22) Filed: Jun. 8, 2006

(65) Prior Publication Data

US 2007/0006474 A1 Jan. 11, 2007

(30) Foreign Application Priority Data

Jun. 22, 2005 (JP) ............................ 2005-181862

(51) Int. Cl.
*G01B 3/14* (2006.01)

(52) U.S. Cl. ............................ 33/563; 33/562; 33/1 G

(58) Field of Classification Search .......... 33/562-563, 33/613, 645, 1 G, 566, 518, 199 R
See application file for complete search history.

(56) References Cited

U.S. PATENT DOCUMENTS 6,643,945 B1 * 11/2003 Starks ........................ 33/566
2005/0188559 A1 * 9/2005 Kastberg ..................... 33/562
2005/0246914 A1 * 11/2005 Perea .......................... 33/562

* cited by examiner

*Primary Examiner*—Yaritza Guadalupe-McCall
(74) *Attorney, Agent, or Firm*—Bacon & Thomas, PLLC

(57) ABSTRACT

A multiple-bolt insertion tool in accordance with the present invention simultaneously inserts bolts into at least two bolt holes arrayed in a workpiece and includes a bolt receiving member and a hold-and-release mechanism. The bolt receiving member includes bolt positioning portions which establish a positional relationship among the bolts that are to be inserted that matches the positional relationship of the bolt holes, and a tool positioning portion, which fits (mates with) the workpiece to locate the bolt positioning portions in alignment with corresponding bolt holes in the workpiece. The hold-and-release mechanism holds the bolts in the bolt positioning portions until the tool positioning portion is mated with the workpiece and can release the bolts from the bolt positioning portions.

16 Claims, 5 Drawing Sheets

MULTIPLE-BOLT INSERTION TOOL

The disclosure of Japanese Patent Application No. 2005-181862 filed on Jun. 22, 2005, including the specification, drawings and abstract, is incorporated herein by reference in its entirety.

BACKGROUND OF THE INVENTION

1. Field of the Invention

The present invention relates to a multiple-bolt insertion tool that can insert a plurality of bolts into their prescribed holes, simultaneously and accurately.

2. Description of the Related Art

In the operation of assembling an automotive automatic transmission, for example, a plurality of bolts is used to fasten the transmission case. Conventionally, bolts are supplied one at a time to their prescribed holes in the workpiece by an automatic bolt supply unit. However, in the case of a workpiece that requires a plurality of bolts, the operator inserts the bolts one at a time into the workpiece before tightening them by means of a tool such as a nut runner, wrench, etc. This has become a hindrance to reducing the time spent on bolt tightening operations. For this reason, a need exists for the development of a simple bolt insertion tool that can insert a plurality of bolts simultaneously.

SUMMARY OF THE INVENTION

The present invention has been devised in light of the above, and it is an object of the present invention to provide a simple multiple-bolt insertion tool that can insert a plurality of bolts into the required locations simultaneously.

A multiple-bolt insertion tool in accordance with the present invention is a multiple-bolt insertion tool capable as simultaneously inserting bolts into at least two bolt holes in a workpiece having a plurality of bolt holes, and includes a bolt receiving member and a hold-and-release mechanism. The bolt receiving member includes bolt positioning portions, which establish a positional relationship among the bolts to be inserted that matches the positional relationship of the bolt holes, and a tool positioning portion, which is contoured to mate with (fit) the workpiece and which locates the bolt positioning portions in positions aligned with the bolt holes in the workpiece. The hold-and-release mechanism holds the bolts in the bolt positioning portions until the tool positioning portion is properly fitted on the workpiece and then releases the bolts from the bolt positioning portions with the tool positioning portion mounted on (fitted to) the workpiece.

Because the multiple-bolt insertion tool in accordance with the present invention is provided with a bolt receiving member that includes bolt positioning portions and a tool positioning portion, it can simultaneously position a plurality of bolts in alignment with their corresponding bolt holes. Also, with the hold-and-release mechanism, the bolts can be held until they are positioned in alignment with their corresponding bolt holes, and after all of the bolts are properly positioned (aligned with their corresponding bolt holes), they can be simultaneously released and inserted.

In a preferred embodiment of the multiple-bolt insertion tool of the present invention, the bolt receiving member has positioning holes into which the shafts of the bolts are inserted, and the tool positioning portion has an outer edge contoured (shaped) to conform to the shape of the workpiece. It is also preferred that the hold-and-release mechanism includes slats and a holding plate. The slots extend from the positioning holes to openings at the outer (contoured) edge of the bolt receiving member. The holding plate has holding holes that hold the heads of the bolts and is coupled with the bolt receiving member in such a way that the holding plate and the bolt receiving member can be moved relative to each other between contacting and separated positions. The multiple-bolt insertion tool in accordance with this preferred embodiment is suitable for simultaneously inserting bolts into bolt holes that are arranged along an irregularly shaped concave or convex line on the outer periphery or inner periphery of the workpiece.

In another preferred embodiment the bolt positioning portions are positioning holes (encircled openings) into which the shafts of bolts are inserted. It is also desirable for the tool positioning portion to be a fitting that is formed on the bolt receiving member and that fits a prescribed location on the workpiece. It is also preferred that the hold-and-release mechanism include insertion holes and a holding plate. The insertion holes, into which heads of bolts can be inserted, are contiguous with (open to) the bolt positioning holes in the bolt receiving member. The holding plate has holding holes into which heads of bolts can be inserted, and can be rotated back and forth relative to the bolt receiving member. The multiple-bolt insertion tool in accordance with this preferred embodiment is suitable for inserting bolts into a plurality of bolt holes that are arranged around a circular periphery of the workpiece.

With the multiple-bolt insertion tool of the present invention, because all of the bolts can be held in advance by the bolt positioning portions, it is possible for the bolts to be set into the tool by a bolt supply unit. It is therefore possible to reduce the time spent on bolt tightening operations. Because the tool has a tool positioning portion, all of the bolts can be inserted simultaneously and accurately into a plurality of prescribed bolt holes, making it possible to significantly reduce the time required for the operator to insert the bolts.

DETAILED DESCRIPTION OF THE PREFERRED EMBODIMENTS

Preferred embodiments of the multiple-bolt insertion tool of the present invention will be explained below with reference to the accompanying drawings.

First Embodiment

Figure 8:
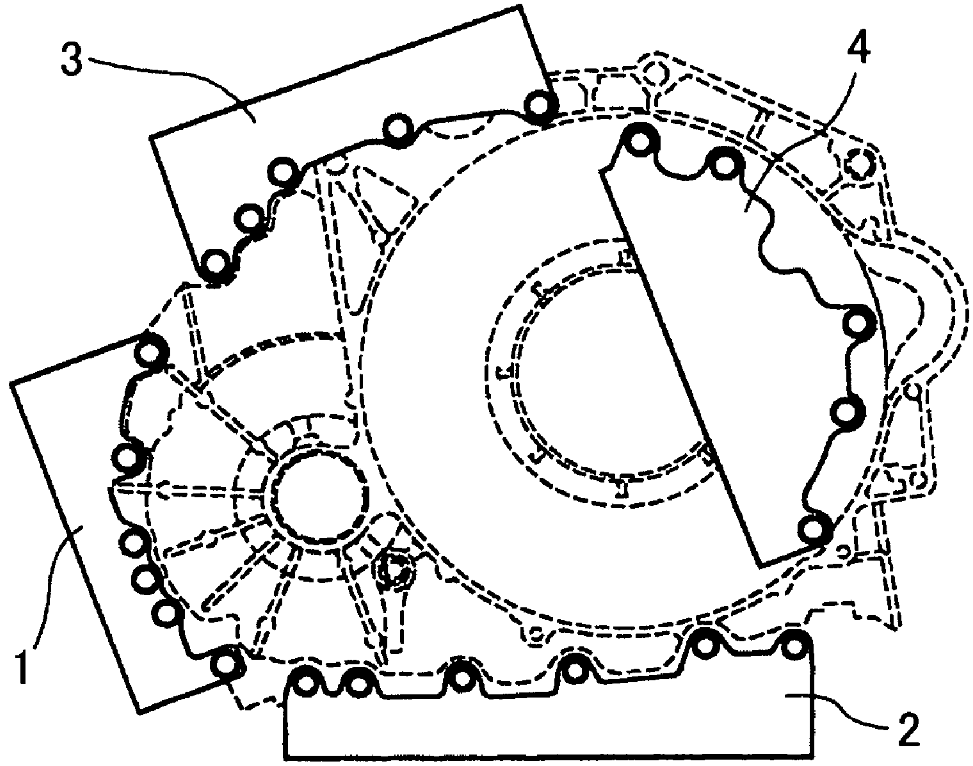
FIG. 8 is a plan view showing an example of the positional relationship between an automatic reduction gear case and multiple-bolt insertion tools according to the present invention.

A first embodiment of the present invention is a bolt insertion tool for inserting bolts and tightening a flange portion of an automatic transmission case as shown in FIG. 8. As shown in FIG. 8, seventeen bolts for tightening the flange are inserted by three multiple-bolt insertion tools 1, 2, 3. The three multiple-bolt insertion tools 1, 2, 3 are suitable for bolt holes which are arranged along an irregular concave curve or are arranged along an outer periphery of the case. The multiple-bolt insertion tool 1 of the first embodiment of the present invention will now be explained with reference to FIGS. 1 to 5.

The multiple-bolt insertion tool 1 simultaneously inserts six bolts into holes in an automatic transmission case and includes a bolt receiving member 12 (refer to FIG. 2) and a holding plate 14. The bolt receiving member 12 and the holding plate 14 are coupled by a hinge 16 that allows relative pivoting movement between closed (touching) and open (separated) positions. The holding plate 14 can be pivoted by holding a handle 18 that is attached to the bolt receiving member 12 in one hand and pressing on a lever 20 that is attached to the holding plate 14.

Figure 3:
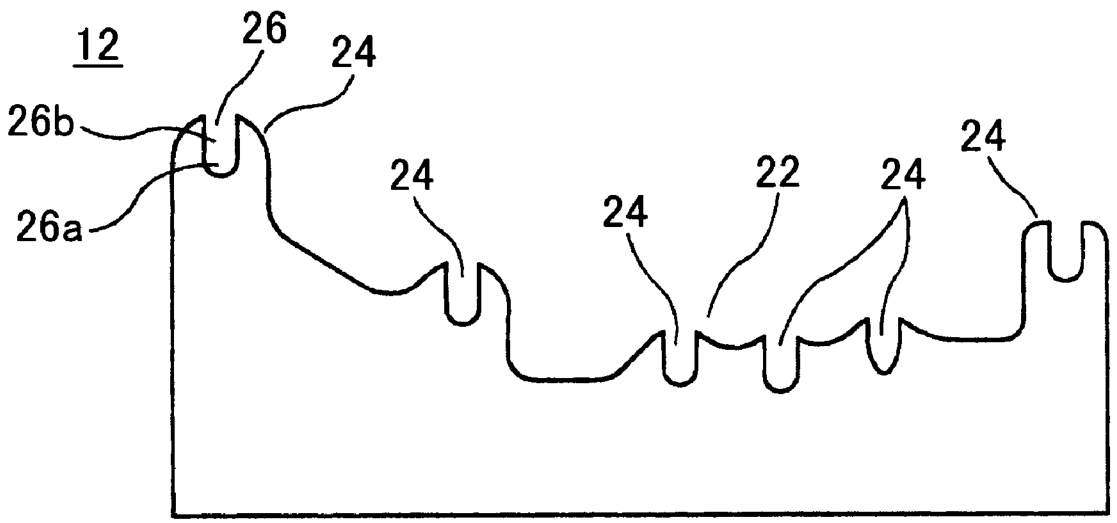
FIG. 3 is a plan view of a bolt receiving member of the first embodiment.

The bolt receiving member 12 is shaped such that it brings one side of a roughly rectangular plate into contact with the flange at a prescribed position and has an irregularly shaped outer edge 22 that serves as a tool positioning portion. As shown in FIG. 3, six bolt positioning notches (slots) 24 are formed in the irregularly shaped outer edge 22 to establish a positional relationship among the six bolts, which matches the positional relationship of the bolt holes in the flange. Open-ended slots 26 are also formed in the bolt receiving member 12. In the slots 26, positioning holes 26*a*, which are smaller than the outside diameter of flange b of a head B1 of a bolt B in FIG. 2A and somewhat larger than the outside diameter of a shaft B2 of the bolt B, are continuous with slits 26*b*, whose width is the same as the diameter of the positioning holes 26*a*. The slots 26 are structured such that, while supporting the head B1 of the bolt B, they allow the bolt shaft B2 to pass therethrough. Note that the slits 26*b* may be shaped so that they become wider as they near the outer edge 22.

Figure 1:
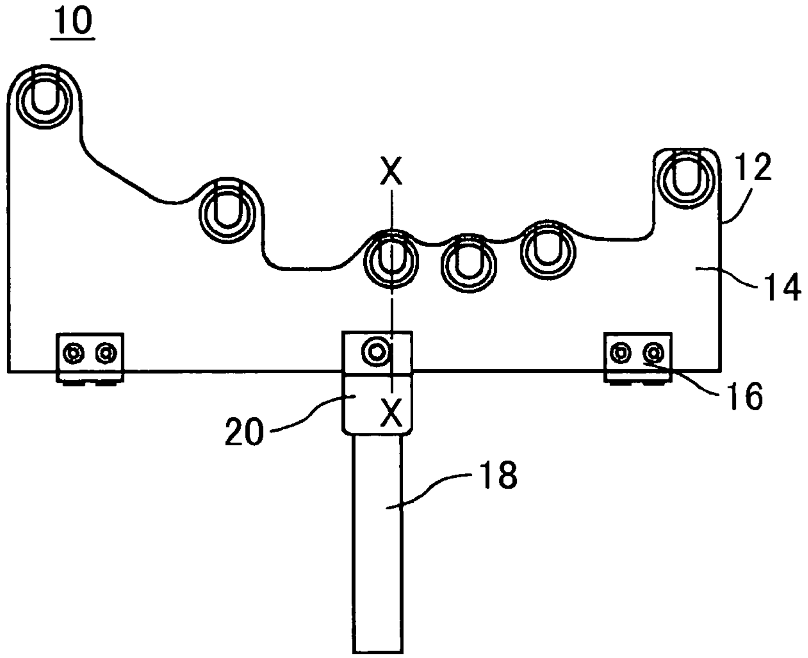
FIG. 1 is a schematic plan view of a first embodiment of the present invention.
Figure 2A:
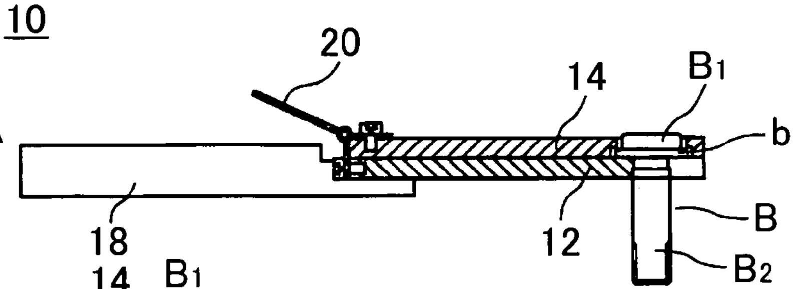
FIG. 2A is a schematic sectional view taken along line X-X in FIG. 1.
Figure 2B:
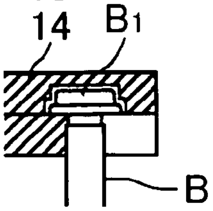
FIG. 2B is a partial sectional view of another form of the bolt holding portion of the first embodiment.
Figure 4:
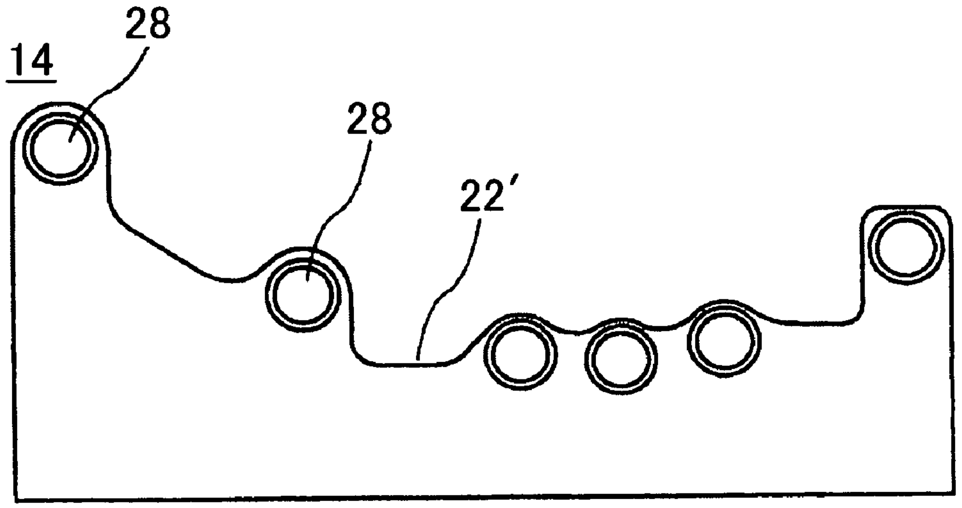
FIG. 4 is a plan view of a holding plate of the first embodiment.

The holding plate 14, which is attached to the bolt receiving member 12, and the slits 26*b* constitute a hold-and-release mechanism that holds the bolts B and releases them from the positioning holes 26*a* in the bolt receiving member 12. In the same manner as the bolt receiving member 12, the holding plate 14 has one side shaped as a roughly rectangular plate for contact with the flange at a prescribed position and, as shown in FIG. 4, has an outer edge 22' with an irregular shape that matches the shape of the outer edge 22 of the bolt receiving member 12. Holding holes 28 that are slightly larger than the head B1 of the bolt B are drilled in the holding plate 14 in positions that correspond to the six positioning holes 26*a* in the bolt receiving member 12. The holding holes 28 are shaped to match the shape of the head B1, so the flanges (seats) b of the heads B1 are held by the counterbore shoulders 28*a* of the holding holes 28 (refer to FIG. 5), which prevents the bolts B from slipping out of the holding holes 28. Note that the holding holes 28 are concave shaped when viewed from the bottom of the holding plate 14 in FIG. 2A, so that they can accept the heads B1 of the bolts B, as shown in FIG. 2B.

The bolt receiving member 12 and the holding plate 14 may be formed from flat sheets that are lightweight and have suitable strength. The material of the sheets is not particularly restricted, but a transparent material such as acrylic sheet, for example, is preferred. A transparent material makes it easy to visually confirm that the tip of the bolt B is inserted in the prescribed hole in the transmission flange by viewing through the bolt receiving member 12 and the holding plate 14 during operation.

Insertion of the bolts into the bolt holes, using the multiple-bolt insertion tool 1, will now be described.

First, in a preparation stage, six bolts B are inserted into and held in the positioning holes 26*a* of the bolt receiving member 12.

Figure 5:
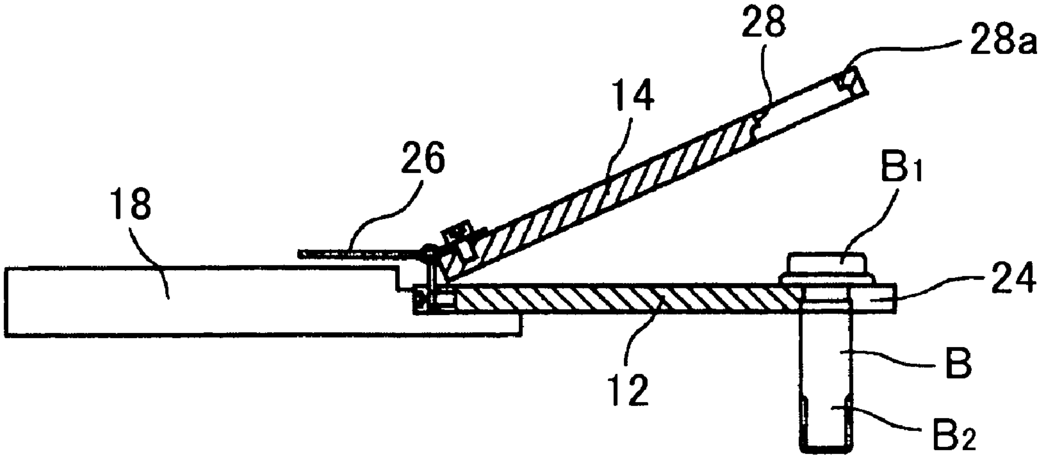
FIG. 5 is a schematic sectional view showing the holding plate of the first embodiment pivoted into a released state.

Then, with the lever 20 of the multiple-bolt insertion tool 10 depressed so that the holding plate 14 is released, as shown in FIG. 5, the shafts B2 of the bolts B are inserted by the bolt supply unit into the positioning holes 26*a* of the slots 26 of the bolt receiving member 12 wherein they are supported by the bolt positioning portions 24. Next, the lever 20 is returned to its original position so that the holding plate 14 is brought into contact with the bolt receiving member 12, putting the tool into a "bolt holding state", as shown in FIG. 2. With six bolts held by the multiple-bolt insertion tool 1, the preparation stage is complete.

Next, the six bolts are inserted into the bolt holes. First, the operator holds the handle 18 in one hand and brings the tool positioning portion (outer edge) 22 of the bolt receiving member 12 into contact with the prescribed position on the flange, thereby positioning each bolt B held in a bolt positioning slot 24, into a position where it is aligned with its corresponding bolt hole. Next, the operator depresses the lever 20 to pivot the holding plate 14 upward to its released position, thereby releasing the hold on the bolts B. Maintaining the holding plate 14 in a released state, the operator lowers the bolt receiving member 12 while drawing it back, separating the multiple-bolt insertion tool 1 from the flange. The tip of the shaft of each bolt B is aligned with a bolt hole. Therefore, when the six bolts are separated from the slots 24 and are no longer thereby supported, they simultaneously drop into the bolt holes under their own weight.

Second Embodiment

Figure 6:
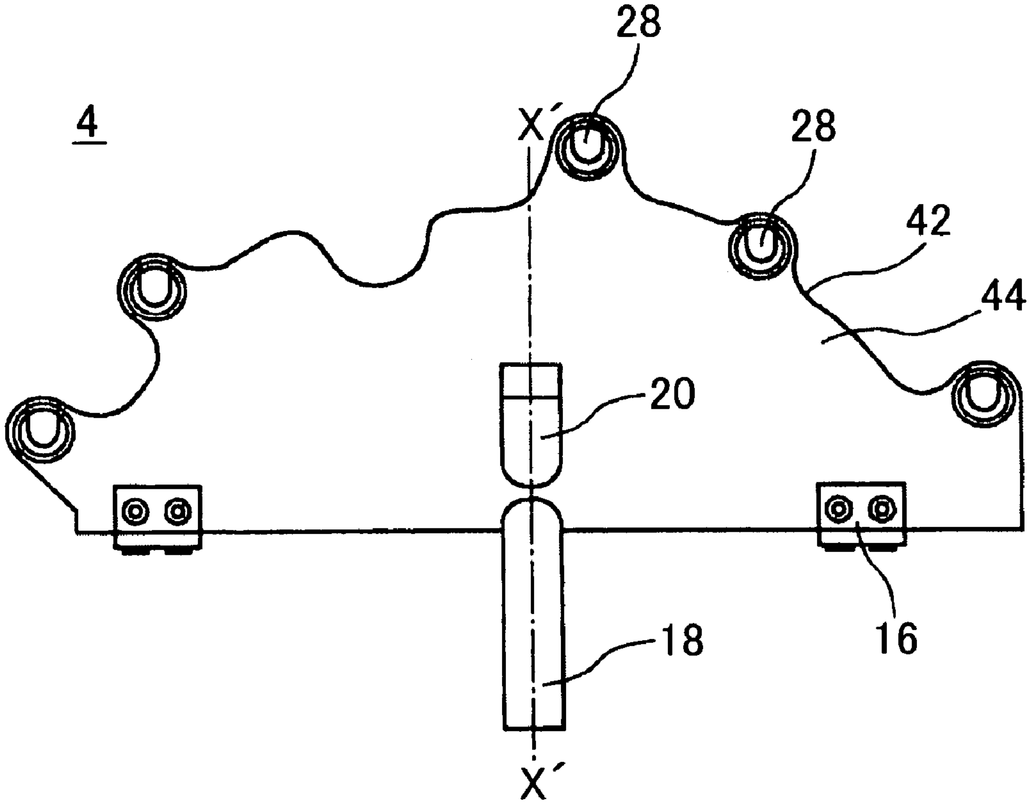
FIG. 6 is a schematic plan view in of a second embodiment of the present invention.
Figure 7:
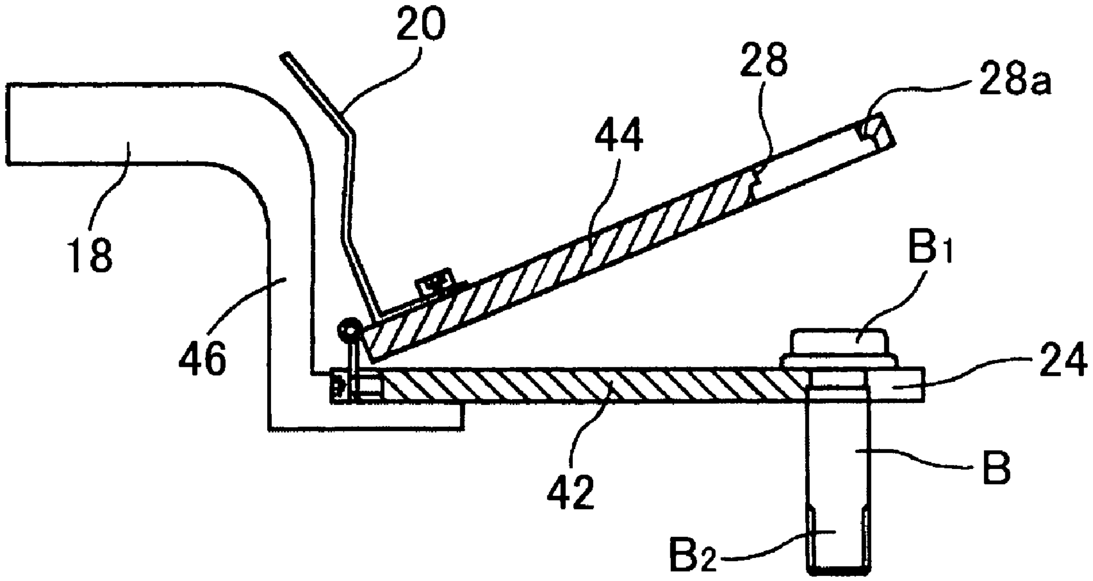
FIG. 7 is a schematic sectional view taken along line X'-X' in FIG. 6.

As shown in FIGS. 6 and 7, a second embodiment of the present invention is a multiple-bolt insertion tool 4 that inserts bolts into a flange around the inner periphery of an automatic transmission case, as shown in FIG. 8. This embodiment is suitable when bolts are arranged in an irregular convex curve as viewed from the direction from which the multiple-bolt insertion tool is brought into contact or are arranged along an inner periphery of the case.

As seen in FIGS. 6 and 7, the multiple-bolt insertion tool 4 inserts five bolts and, in the same manner as the first embodiment, includes a bolt receiving member 42 and a holding plate 44. Except for the irregular shape of the tool positioning portion (outer edge), and the shapes of the handle 18 and the lever 20, the second embodiment is basically the same as the first embodiment. Therefore, for the parts that are the same as the first embodiment, identical reference symbols are used, and explanation thereof is omitted.

As shown in FIG. 7, the handle 18 includes a portion extending in parallel with bolt receiving member 46, which portion is continuous with a portion 46 that is perpendicular to the bolt receiving member 42. Also, the lever 20 is attached perpendicular to the holding plate 44 such that when holding the handle 18, one can open and close the holding plate 44 with one's fingertip.

The multiple-bolt insertion tool 4 includes the handle 18 and the lever 20 as described above, so the multiple-bolt insertion tool 4 can be positioned by lowering it into the contact position from above the case. Further, the multiple-bolt insertion tool 4 can simultaneously insert five bolts into bolt holes in the flange portion on the inner periphery of the case.

Third Embodiment

Figure 9:
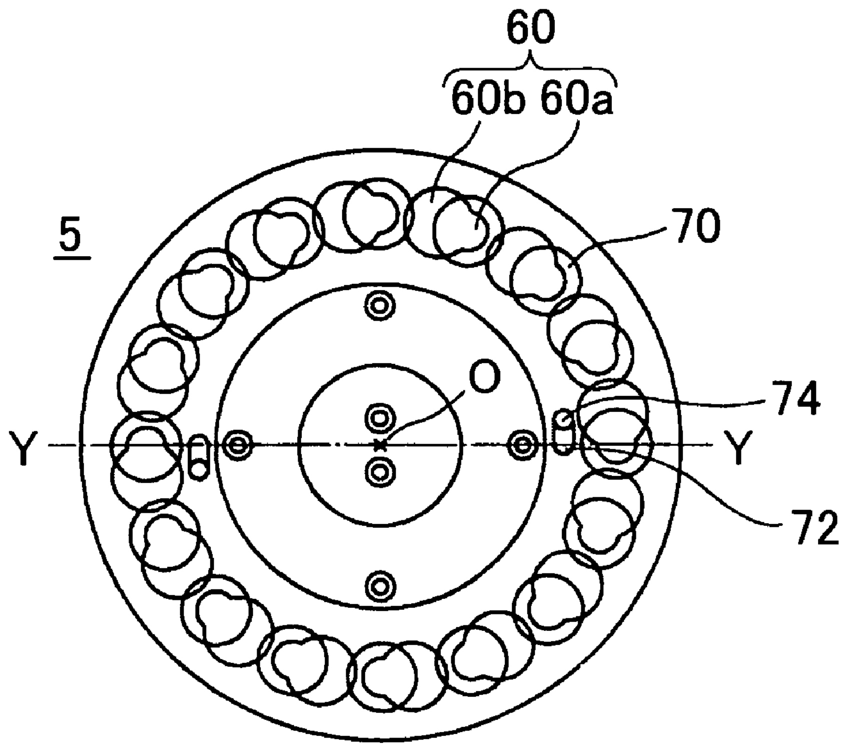
FIG. 9 is a schematic plan view of a third embodiment of the present invention.
Figure 10:
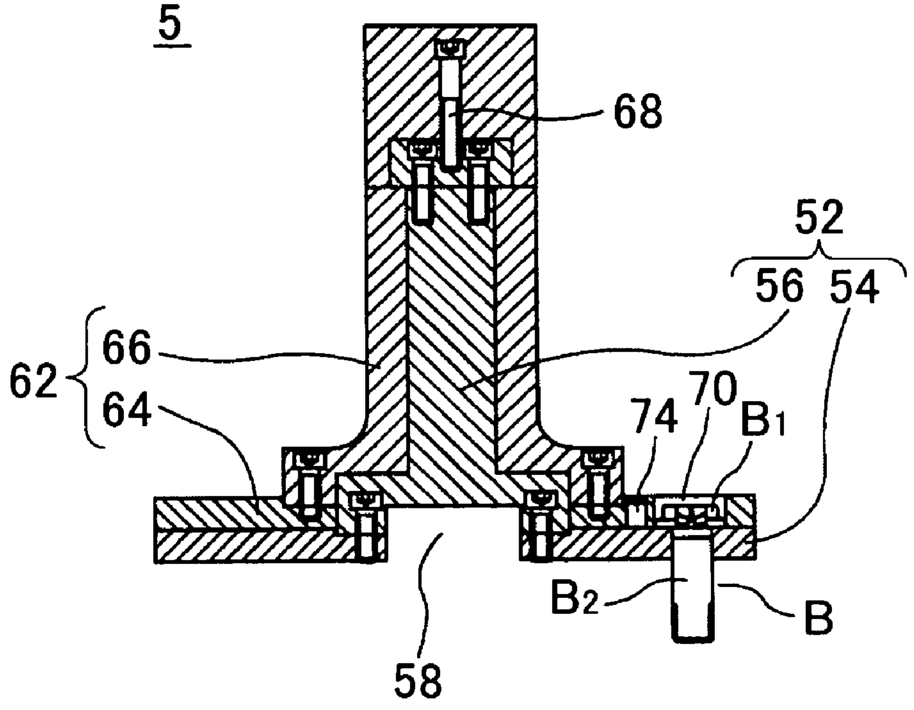
FIG. 10 is a schematic sectional view taken along line Y-Y in FIG. 9.

A third embodiment of the present invention, as shown in FIGS. 9 and 10, is a multiple-bolt insertion tool that is suitable for inserting bolts into a plurality of bolt holes that are arranged in a circular pattern, such as for fastening a driven gear to a differential case, for example.

The multiple-bolt insertion tool 5 has a second disk 64 of a holding member 62 stacked on top of a first disk 54 of a bolt receiving member 52 in such a manner that the second disk 64 can slidably turn relative thereto.

The bolt receiving member 52 includes the first disk 54, in which a plurality of irregularly shaped holes 60 are drilled, and a first shaft 56 whose vertical axis passes through the center O of the first disk 54, the first shaft 56 standing on the first disk 54. A protruding portion of the differential gear fits into the center of the bottom of the bolt receiving member 52, within a recess 58 which serves in positioning by matching the positions of the irregularly shaped holes 60 in the first disk 54 with the positions of the bolt holes in the differential gear. The irregularly shaped holes 60 include positioning holes 60*a*, through which shafts B2 of bolts B extend, and insertion holes 60*b* which have a larger diameter than that of the positioning holes, which are contiguous with the positioning holes 60*a*, and through which heads B1 of the bolts B can pass. Further, the outer peripheries of the insertion holes and the positioning holes overlap so that a bolt can be moved circumferentially from a positioning hole 60*a* into the adjoining insertion hole 60*b*. Thus, in this embodiment the first disk 54 of the bolt receiving member 52 serves as a bolt positioning means.

The holding member 62 includes the second disk 64, which turns and slides on the first disk 54 of the bolt receiving member 52, and a second shaft 66, which is coaxial with and turns with its inner circumferential surface sliding the first shaft 56 of the bolt receiving member 52. The second shaft 66 is fixed to and extends perpendicular from the second disk 64. Holding holes 70, which are slightly larger than heads B1 of the bolts B, are drilled in the second disk 64 and correspond to the irregularly shaped holes 60 that are drilled in the first disk 54 of the bolt receiving member 52. The holding member 62 is rotatably connected to the bolt receiving member 52 by a bolt 68 in such a way that the holding holes 70 can be aligned with the positioning holes 60*a*.

An arc-shaped slot 72 is formed in the second disk c4, and receives a stopper 74 that fixes the position of the first disk 54 of the bolt receiving member 52, relative to the second disk 64. In this embodiment, a hold-and-release mechanism is formed by the irregularly shaped holes 60 and the second disk 64, which is equivalent to a holding plate, that is held in such a way that it can reversibly rotate back and forth.

For insertion of bolts into bolt holes using the multiple-bolt insertion tool 5 described above, first, in a preparation stage, sixteen bolts B are inserted into and held in the irregularly shaped holes 60 of the first disk 54 of the bolt receiving member 52. Then, the holding member 62 is rotated so that the centers of the holding holes 70, which are drilled in the second disk 64, are aligned with the centers of the positioning holes 60*a*, with the shafts of the bolts inserted into the irregularly shaped holes 60 of the first disk 54. For insertion, the holding member 62 is rotated clockwise until it makes contact with the stopper 74 and, next, the shafts B2 of the bolts B are inserted by the bolt supply unit into the positioning holes 60*a*, wherein the bolts B are held, thus completing the preparation stage.

Next, the sixteen bolts are inserted into the bolt holes in circular array. First, the operator holds the shaft 66 of the holding member 62 in one hand and fits the recess 58 in the bottom of the bolt receiving member 52 onto the protruding portion of the differential gear, thereby positioning each bolt B held by the first disk 54 in a position aligned with its corresponding bolt hole. After the bolts are positioned, the holding member 62 is rotated in the opposite direction from that in which it was rotated during the preparation stage (that is, it is rotated counterclockwise in FIG. 9), until it is stopped by the stopper 74. The insertion holes 60*b* in the first disk 54 are thereby aligned with the holding holes 70 in the second disk 64, so that all of the bolts that are held on the first disk 54 are released and drop out under their own weight, and are thereby simultaneously inserted into the bolt holes.

Note that in this third embodiment, as in the first embodiment, a transparent acrylic material that is comparatively lightweight and has suitable strength may be used as the material of the bolt receiving member 52 and the holding member 62.

Thus, a multiple-bolt insertion tool according to the present invention can insert a plurality of bolts into an array of bolt holes extremely simply and accurately, making it suitable for fastening automotive reduction gears and differential gears, for example.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A multiple-bolt insertion tool for simultaneously inserting bolts into at least two bolt holes in a workpiece, comprising:

a bolt receiving member that includes bolt positioning portions which establish a positional relationship among the bolts to be inserted, and a tool positioning portion which mates with the workpiece in a manner locating the bolt positioning portions in positions aligned with the bolt holes in the workpiece; and a hold-and-release mechanism that holds the bolts in the bolt positioning portions until the tool positioning portion is fitted to the workpiece and that can release the bolts from the bolt positioning portions after the tool positioning portion has been fitted to the workpiece.

2. The multiple-bolt insertion tool according to claim 1, wherein the bolt positioning portions are positioning holes into which shafts of bolts can be inserted;

the tool positioning portion is a contoured outer edge of the bolt receiving member, shaped to conform to the shape of the workpiece; and the hold-and-release mechanism comprises slots extending from the positioning holes to the contoured outer edge of the bolt receiving member and a holding plate that is coupled with the bolt receiving member in a manner allowing relative movement between the holding plate and the bolt receiving member, between a closed position holding the bolts with faces of the holding plate and the bolt receiving member in contact and an open position wherein the holding plate is separated from the bolt receiving member allowing the bolts to be released by sliding along said slots.

3. The multiple-bolt insertion tool according to claim 2, wherein:

the bolt positioning portion and the holding plate are hinged together and the relative movement is pivoting movement.

4. The multiple-bolt insertion tool according to claim 2, wherein the width of the slots and diameter of the positioning holes are smaller than the heads of the bolts.

5. The multiple-bolt insertion tool according to claim 2, wherein the holding plate has a plurality of openings for receiving and holding the heads of the bolts, which openings align with the positioning holes in the closed position.

6. The multiple-bolt insertion tool according to claim 5, wherein the openings are recesses.

7. The multiple-bolt insertion tool according to claim 1, wherein:

the bolt positioning portions are positioning holes into which shafts of bolts can be inserted; and the hold-and-release mechanism comprises slots extending form the positioning holes to an outer edge of the bolt receiving member and a holding plate that is coupled with the bolt receiving member in a manner allowing relative movement between the holding plate and the bolt receiving member, between a closed position holding the bolts with faces of the holding plate and the bolt receiving member in contact and an open position wherein the holding plate is separated from the bolt receiving member allowing the bolts to be released by sliding along said slots.

8. The multiple-bolt insertion tool according to claim 7, wherein:

the bolt positioning portion and the holding plate are hinged together and the relative movement is pivoting movement.

9. The multiple-bolt insertion tool according to claim 7, wherein the width of the slots and diameter of the positioning holes are smaller than the heads of the bolts.

10. The multiple-bolt insertion tool according to claim 7, wherein the holding plate has a plurality of openings for receiving and holding the heads of the bolts, which openings align with the positioning holes in the closed position.

11. The multiple-bolt insertion tool according to claim 10, wherein the openings are recesses.

12. The multiple-bolt insertion tool according to claim 1, wherein the bolt positioning portions are positioning holes into which the shafts of bolts are inserted; and the tool positioning portion is integral with the bolt receiving member and mates with a prescribed portion of the workpiece; and the hold-and-release mechanism comprises insertion holes adjoining and opening to respective bolt positioning holes in the bolt receiving member and into which shafts of bolts can be inserted, and a holding plate that has holding recesses, which receive the heads of bolts, and that can be rotated back and forth through an acute angle relative to the bolt receiving member, between a holding position wherein the bolts are retained in the positioning holes and a release position wherein the bolts have been moved to the insertion holes.

13. The multiple-bolt insertion tool according to claim 12, wherein:

the bolt positioning portion and the holding plate are hinged together and the relative movement is pivoting movement.

14. The multiple bolt insertion tool according to claim 12, wherein the diameter of the positioning holes is smaller than that of the heads of the bolts and wherein the insertion holes have a diameter larger than that of the heads of the bolts.

15. The multiple-bolt insertion tool according to claim 12, wherein the holding plate has a plurality of openings for receiving and holding the heads of the bolts, which openings align with the positioning holes in the closed position.

16. The multiple-bolt insertion tool according to claim 15, wherein the openings are recesses.

* * * * *